Dec. 27, 1960  L. J. BRIGGS  2,965,975
SELF-TUTORING AND TESTING DEVICE
Filed June 6, 1957  3 Sheets-Sheet 1
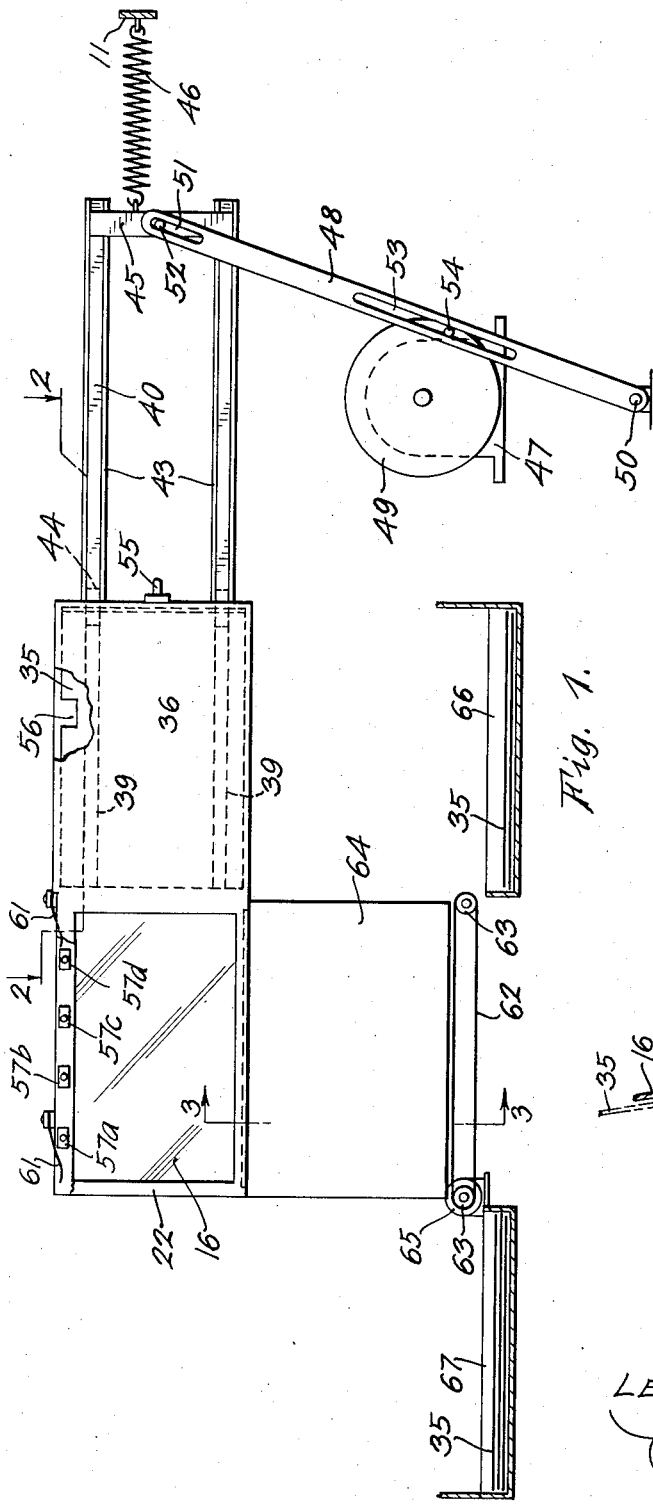
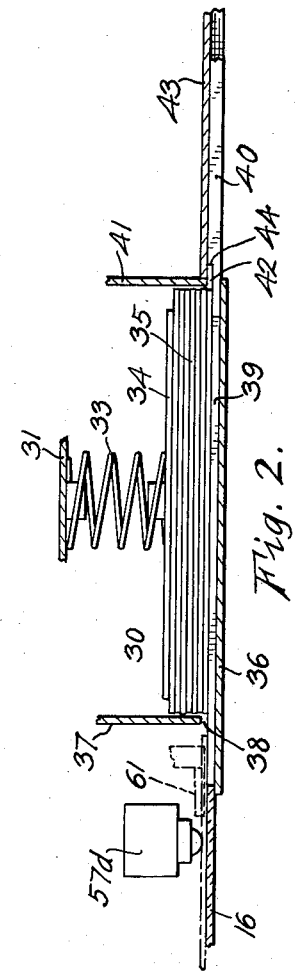
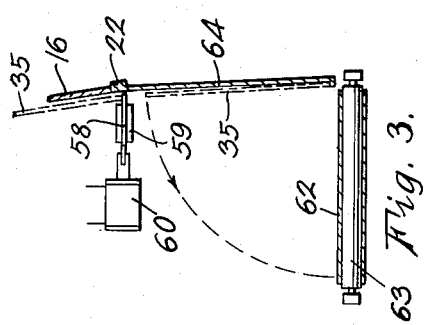
INVENTOR.
LESLIE J. BRIGGS
BY
ATTORNEY Dec. 27, 1960   L. J. BRIGGS   2,965,975
SELF-TUTORING AND TESTING DEVICE
Filed June 6, 1957   3 Sheets-Sheet 2
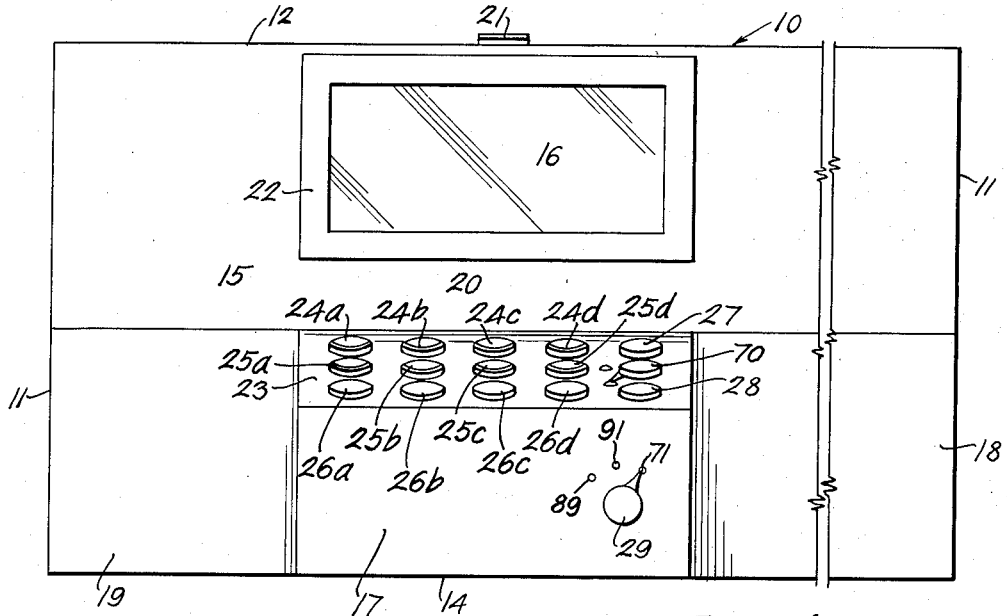
Fig. 4.
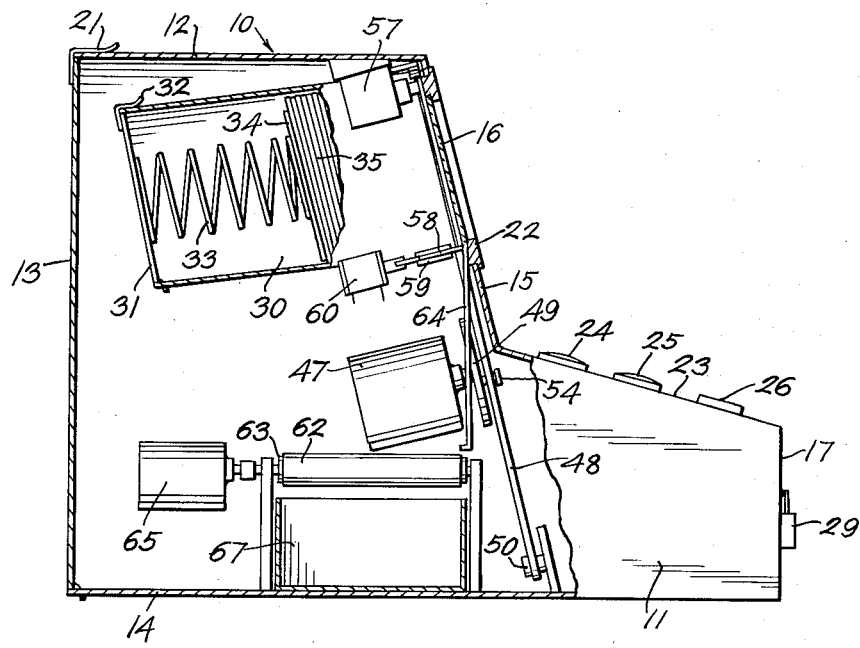
Fig. 5.
INVENTOR.
LESLIE J. BRIGGS
BY
ATTORNEY Dec. 27, 1960

L. J. BRIGGS 2,965,975

SELF-TUTORING AND TESTING DEVICE

Filed June 6, 1957

INVENTOR.
LESLIE J. BRIGGS
BY
ATTORNEY

United States Patent Office 2,965,975
Patented Dec. 27, 1960

2,965,975

SELF-TUTORING AND TESTING DEVICE

Leslie J. Briggs, Denver, Colo.
(1216 State St., Santa Barbara, Calif.)

Filed June 6, 1957, Ser. No. 663,949

11 Claims. (Cl. 35—9)

This invention may be manufactured and used by or for the Government for governmental purposes without payment to me of any royalty thereon.

The invention relates to training aids and, more particularly, to a coaching and testing device.

In recent years many educators have begun to realize the several serious disadvantages and limitations of the conventional textbook and lecture methods of teaching employed in the classroom. These methods cannot be equated to the needs of each student unless the tutor-individual student relationship is established, and with the shortage of trained teachers, such a relationship is exceedingly difficult to maintain. Also, the poorly-informed, and perhaps less intelligent, student suffers from the comparative relationship that exists between him and his more advanced classmates. Further, ordinary teaching methods make little or no allowance for the knowledge that a given student already includes within his repertoire; but, instead, they require him to restudy that which he already knows in order to learn something new. Finally, textbook study and lectures enable the student to adopt a passive attitude toward learning rather than an active one which would insure eventual mastery of a subject.

As a result, several attempts have been made recently to develop and facilitate self-tutoring and testing devices that would operate automatically and perform the function of the teacher in the highly desirable instructor-individual student learning situation. Many such machines, however, have met with very little success because of their expense and the difficulty experienced by the average student in mastering their operation. Several others can only be used once and are adaptable only to a very limited range of subjects. Most prior art machines for this purpose employ a single teaching method and cannot, therefore, be used for both coaching and testing.

Hence, it is the principal object of the present invention to provide an automatic self-coaching and testing device that takes the place of an instructor in several types of learning situations.

A second object is the provision of a self-tutoring device which can be used, without modification, to teach any subject that can be presented in question and answer form.

A third object is to provide a teaching and testing machine that can be selectively controlled to simulate any one of four types of tutoring methods, each having certain particular advantages, so that the student can be furnished with a course of study presented in a manner to suit his specific requirements.

Another object is to provide a machine that will automatically determine the prior knowledge of a given student and, thereafter, teach and test him in only those areas in which he is deficient.

Still another object is the elimination of the comparative relationship among students and the substitution of means whereby each pupil learns at a rate particularly suited to his individual needs.

An additional object of the invention is the provision of a training aid that demands active participation of the student in the learning process.

Further objects of the invention are to provide a coaching and testing machine that is simple, relatively inexpensive, compact, easy to operate and service, foolproof and decorative in appearance.

Other objects will be in part apparent and in part pointed out specifically hereinafter in connection with the description of the drawing that follows, in which:

Figure 1 is a diagrammatic representation showing the card-sorting apparatus of the automatic self-coaching and testing device of the present invention;

Figure 2 is a section taken along line 2—2 of Figure 1;

Figure 3 is a section taken along line 3—3 of Figure 1;

Figure 4 is a front elevation showing the tutoring device in its entirety, portions thereof having been broken away to conserve space;

Figure 5 is a side elevation thereof, portions of which have been broken away to expose the interior to view; and, Figure 6 is a schematic wiring diagram showing the electrical control circuit of the machine.

Figure 6:
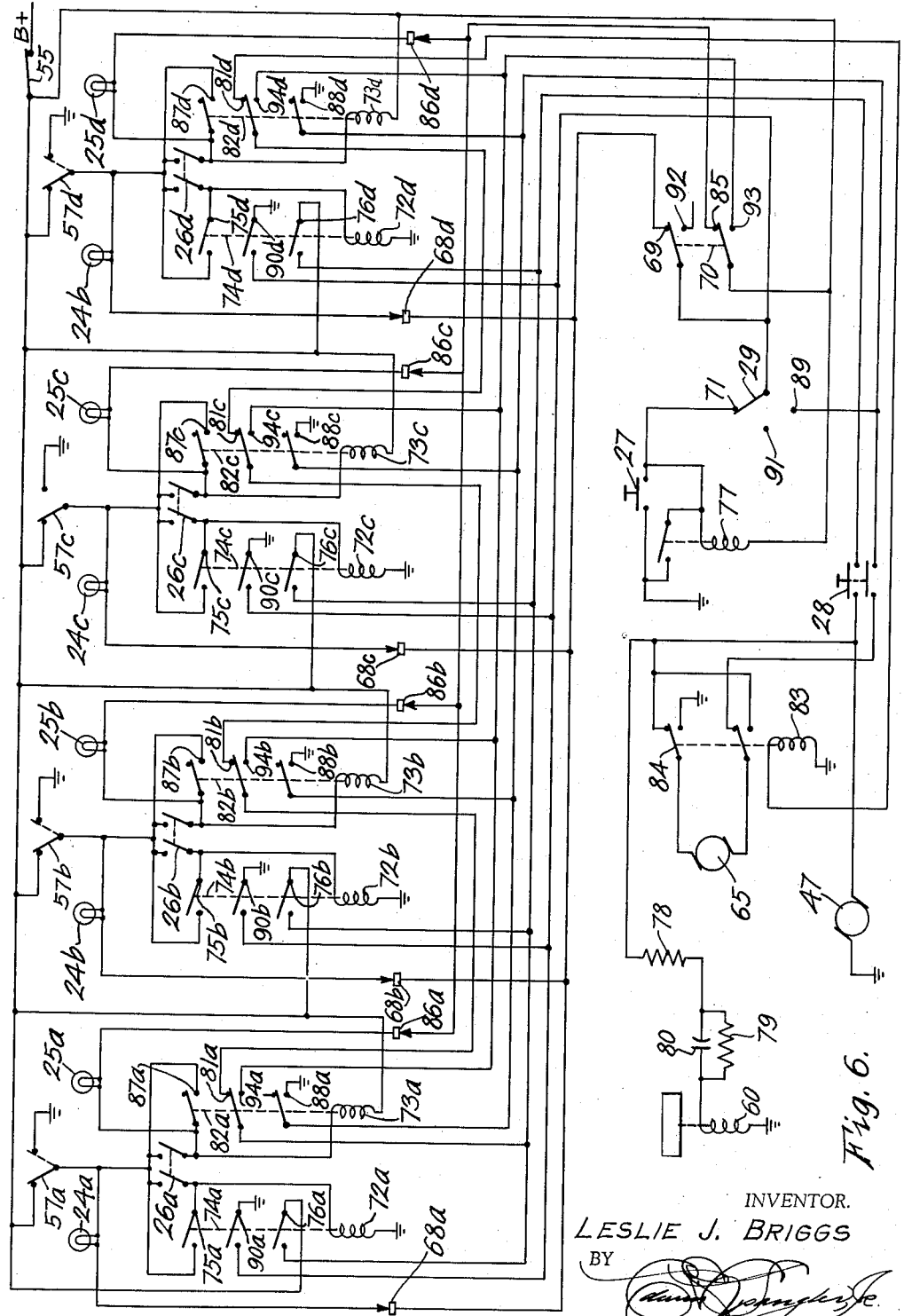

Before entering into a detailed description of the accompanying drawing and the single specific embodiment of the present invention illustrated therein, it will be well to outline the basic principles of operation and functional characteristics of the machine.

The subject matter selected for presentation on the machine is reduced to questions and a plurality of multiple-choice answers to each question, only one of which is correct, while the others are incorrect, or vice versa. Each question and the several answers corresponding thereto are arranged on a separate slide which is indexed or coded to indicate the desired answer from among those presented. The slides may, of course, be coded in advance of placing the questions and answers thereon which merely requires that the desired answer be located or identified in accordance with the particular coding in the slide on which it appears. The questions and/or answers may be presented in several forms other than printing, such as, for example, photographs, diagrams and pictorial representations. Also, the term "slide" as used herein is intended to refer broadly to any media on which the questions and answers can be presented to the student's view, such as ordinary cards, sheets, photographs, plates and the like either unmounted or, if permanency is desired, mounted within rigid metal, glass or plastic frames. Also, the code carried by the slide to identify the desired answer to the question presented thereon may take any one of a number of well-known forms as can the right-wrong answer sensing mechanism which will presently be described; provided, however, the code and sensing mechanism must cooperate to identify a given student response as being correct or incorrect and trigger a sorting mechanism accordingly.

The slides are presented to the student's view one at a time by an appropriate feeding mechanism which sets the right-wrong answer sensing mechanism in accordance with the particular code found on the slide. Before the student can actuate the feeding mechanism and move another slide into view, he must participate actively in the learning or testing situation by selecting one of the proffered answers on the slide previously fed and presently in view. Thus, a choice is demanded by the machine and, as will appear hereinafter, selection of the correct answer will materially affect the time and effort the student must spend later on.

The student's response triggers the right-wrong answer sensing mechanism and feeds the slide into one of two piles depending upon whether the response was correct or incorrect. Thus, on the first run through a given set of slides, the device automatically determines and separates that which the student knows from that which he does not know about the subject. If desired, the machine can then be set so the student reviews on the second and succeeding runs only those matters which his responses indicate he has not learned.

The actual response of the student is made by manually selecting one of a plurality of answer switches which are keyed to the various answers and to the right-wrong answer sensing mechanism which has been pre-set in accordance with the code on the slide. In addition, the button that is chosen triggers a signal system which indicates to the student whether his selection has been correct or not.

All the functional mechanisms of the device that have been mentioned thus far are controlled by an electrical circuit into which they are connected and which operates to provide any of several teaching modes that are available to the student or the instructor at his selection. The first of these has been identified herein as the "coaching mode" in which the electrical system is connected to indicate immediately the correct answer to each question through the signal system. The coaching mode, of course, does not test the student but rather teaches him the subject by indicating the correct answer to the questions. The second, called the "delayed coaching mode," requires the student to first select an answer; whereupon, the electrical system functions to evaluate the chosen answer and, if incorrect, signal the location of the correct one. The third, the "minimum coaching mode" requires that the student makes repeated selections of an answer to a given question until the correct one is found. Finally, the "test mode" disconnects the signal system from the electrical system and the first response sorts the slide in accordance with the sensing mechanism and code without a second choice being available or any indication of the correctness or incorrectness of the answer selected.

With reference now to the drawing, one specific embodiment of the self-teaching and testing device of the present invention will be described in detail although it is to be understood that the particular form illustrated is merely illustrative of several such machines that will function in the same general manner and bring about the same result. Figures 4 and 5, in particular, show that the self-tutoring device is housed within a cabinet, indicated in a general way by numeral 10, which includes end walls 11, a top 12, a back 13, a bottom 14, a front panel 15 containing a viewing window 16, and a control box 17 arranged beneath and in front of the viewing window. The cabinet is divided into three functional sections or compartments, a right section 18, a left section 19 and a center section 20 containing the window and control box. The back 13 is removable and has been shown held in place by a spring clip 21. Window 16 is mounted within a frame 22 which is, in turn, mounted in panel 15. Control box 17 projects forwardly from the cabinet and contains the electrical control circuit of Figure 6 which is operated by a control panel 23 on top thereof. The control panel includes a plurality of manually-operated answer switches 26; a signal system which, on the form shown, comprises a signal light 24 and a similar light 25, preferably of a different color, corresponding to each answer switch; a coach switch 27 which is operative to automatically illuminate the right-answer signal light 24 corresponding to the correct answer when the machine is set on coaching mode as will be described in detail hereinafter in connection with Figure 6; and, an actuating switch 28 which, when operated, selects a new slide and moves the slide containing the question that has just been answered into one of the two storage wells which will be described presently. The cabinet is also provided with a mode switch 29, which for illustrative purposes has been shown located on the control box although it is preferably positioned where it is inaccessible to the student, and which is operative to connect the electrical system with the mechanical components of the device in a manner to provide any one of four selected modes of operation that have already been described briefly.

In Figures 2 and 5 it will be noted that a magazine 30 is located within the right section 19 of the cabinet behind front panel 15 thereof. The rear end wall 31 of the magazine is removable and held in place by spring clip 32. A coil spring 33 projects forwardly into the magazine from rear wall 31 and is provided with a plate 34 on the forward end thereof which engages the stack of slides 35 within the magazine and urges them against the front wall 36 thereof. The left side wall 37 of the magazine and front wall 36 thereof have a slot 38 therebetween sized to receive and pass individual slides 35 into position in front of the viewing window 16 in the center section 20. The front wall 36 is formed to provide electrically spaced parallel grooves or tracks 39, shown in Figure 2, which extend from end to end thereof and are sized to receive pick-up arms 40 of the slide-changing mechanism for longitudinal slidable movement therein. The right end wall 41 of the magazine is notched at 42 adjacent the tracks to receive and pass the pickup arms.

The slide-changing mechanism, seen most clearly in Figures 1 and 2, comprises the pick-up arms 40 mounted for longitudinal reciprocating movement within channel-shaped tracks 43 extending to the right in vertically spaced parallel relation from notches 42 and grooves 39 in front plate 36 of the magazine. Specifically in Figure 2, it will be seen that the inside of the pick-up arms is provided with a step 44 adjacent the left end thereof and projecting inwardly from the groove in plate 36 in position to engage and move the front slide 35 of the stack to the left until it lies behind the viewing window 16 of the center section. Bar 45 extends between the parallel pick-up arms near the right ends thereof and is pulled in the direction of right end wall 11 of the cabinet by tension spring 46 connected therebetween. Reciprocal movement of the pick-up arms is accomplished by motor 47 which is operatively connected thereto through arm 48 and disk 49. The lower end of arm 48 is attached to pin 50 for pivotal movement; whereas, the upper end thereof contains a slot 51 which receives pin 52 carried by bar 45 for longitudinal slidable movement. The arm also contains a slot 53 between the ends thereof which receives eccentrically mounted pin 54 on the disk 49. Rotation of the disk acts through pin 54 to pivot arm 48 and moves the bar 45 and pick-up arms 40 to the left within the tracks 43 and grooves 39 in plate 36 thereby moving the foremost slide 35 of the stack in the magazine through slot 38 into position adjacent viewing window 16. As bar 45 reaches the left extremity of its stroke it contacts switch 55 and breaks the circuit through motor 47; whereupon, spring 46 which has been extended, retracts and returns the slide-changing assembly to its original position. After a slide has been moved into position behind the window, spring 33 in the magazine urges the stack forward and places a second slide in position to be picked up. The motor 47 is energized by closing actuating switch 28 in a manner which will be discussed later.

At this point it should be noted that each slide is coded to indicate the position of the correct response from among a plurality of answers to a question presented to the student thereon. As aforementioned, any of several well-known coding systems may be used; however, for purposes of illustration, a simple notch 56 in the edge of the slide provides the code as its position relative to the slide is changed. As shown, the notch is placed in any one of four selected positions along the top edge of the slide, each position corresponding to the location of one of the microswitches 57 of the right-wrong answer sensing mechanism to be described shortly. The slide 35, shown in Figure 1, is coded to actuate microswitch 57c indicating that the third of the multiple-choice answers is the correct or desired response to the question presented thereon. Obviously, the slides may be pre-coded and the answers arranged thereon to correspond with the particular code found on a given slide. The unit illustrated has a maximum of four possible responses although any number over one can be used and the slides can be coded accordingly although not all the available responses need be supplied with answers corresponding thereto. Frame 22 covers the microswitches and the coding on the slides so that the student is not clued to the correct answer.

The slide-sorting mechanism will now be described in connection with Figures 1, 3 and 5 wherein it will be seen that the slide positioned behind the viewing window 16 is supported upon a gate 58 extending along the lower edge of the window. The gate is mounted in tracks 59 for reciprocal movement and is opened by solenoid 60 which is operatively connected to actuating switch 28. Leaf springs 61 are mounted on the frame 22 and function to urge the slide through the gate. As the actuating switch is closed by the student, solenoid 60 is energized and the gate 58 opens to drop the frame 35 onto continuous belt 62 mounted between laterally spaced rollers 63. A plate 64 extends downwardly from the gate to the belt and functions to deflect the slide over onto said belt as indicated by dotted lines in Figure 3. A reversible D.C. motor 65 is operatively connected to one of the rollers and is connected into the electrical control circuit in a manner to move the upper surface of the belt to the right or left depending upon the correct or incorrect response of the student. At opposite ends of the belt, two storage wells 66 and 67 are located to receive the slides as they pass off the ends thereof. Storage well 66 takes the slides following a correct student response and well 67 receives the slides to which an incorrect response was made.

With reference now to Figure 6 of the drawing, the electrical circuit for controlling the self-tutoring and testing device will now be described. Power for the circuit is supplied by a conventional source of B+ voltage which has not been illustrated for the sake of simplicity. In the description that follows, it will be assumed that the first slide in the magazine is coded to indicate that the third answer of the four possible answers is correct; whereas, the first, second and fourth answers are incorrect.

The B+ voltage is supplied to the normally closed contacts of single-pole double-throw microswitches 57a, b, c and d through the normally closed single-pole single-throw microswitch 55. The arms of switches 57 are biased into closed position and the normally open contacts thereof are grounded. The normally closed contact of each switch 57 is connected in series with one of the right-answer lamps 24 and one of the rectifiers 68; whereas, the foregoing sets of components are connected in parallel with one another in the series circuit including switch 55, one of the normally closed contacts 69 of the double-pole double-throw test switch 70, the coaching mode contact 71 of single-pole triple-throw mode switch 29, and single-pole single-throw coach switch 27 which is grounded. Coach switch 27 is biased open thus opening the circuit through all of the right-answer lamps 24. The normally closed contacts of the microswitches 57 are each serially connected through one of the double-pole single-throw answer switches 26 which are connected in parallel with one another and which have one pole thereof connected serially through one of the right-answer solenoids 72 to ground potential. The other pole of each answer switch is connected serially through one of the wrong-answer solenoids 73 to B+ potential. One pole 75 of each normally open triple-pole single-throw right-answer switch 74 is connected in parallel across each answer switch 26. All three arms of each switch 74 are closed simultaneously upon momentary closure of the corresponding answer switch 26 when the related microswitch 57 is closed as these arms are provided with a common connection with one of the solenoids 72 of right-answer relays (72—74). Poles 76 of switches 74 are connected in parallel across B+ potential and in a series circuit including normally open double-pole single-throw actuating switch 28 and grounded selection motor 47.

Now, at the beginning of the card selection cycle, the switches 57 and switch 55 will be closed and connected to B+ potential; whereas, all the answer switches 26 and actuating switch 28 will be open. Switches 57 and 26 are connected in parallel branches of the series circuit including the selection motor 47 and switches 28 and 55; therefore, the selection motor can be started and the first slide selected by merely holding the actuating switch 28 closed and closing any one of the answer switches 26 momentarily. The momentary closure of one of the answer switches 26 while switches 55, 57 and 28 are closed will, of course, energize the corresponding solenoid 72 closing switch 74 connected thereto and cause the solenoid to hold. Switch 28, on the other hand, must be held in closed position until the arm 45 strikes switch 55 causing the circuit to open releasing the holding voltages, opening switch 74 and allowing the spring 46 to return the slide selection mechanism to its original position with the first slide in position behind the viewing window. Microswitches 57a, b and d will be moved into the open dotted line position while switch 57c remains in its normally closed position.

During the initial run through the slides, the test switch 70 will usually be set in practice position with the arms thereof on the normally closed contacts, as shown, and the mode switch 29 set on contact 71 corresponding to the so-called coaching mode. The student can then study the question and the answers thereto as long as he wishes before closing coach switch 27 to find the correct answer from among the four. As soon as switch 27 is closed, lamp 24c will light as the circuit will be complete from B+ through closed switches 74c, 70, 29 and 27 to ground potential. As the coach switch closes, a ground is supplied to all the right-answer lamps 24 and to coach relay 77 which is connected to B+ through switch 55 and in parallel with switch 27. Thus, relay 77 closes and holds, keeping lamp 24c lighted even though switch 27 is opened as long as switch 55 does not open to remove the holding voltage. None of the wrong-answer lamps 25 can light because all the answer switches 26 are open and all other components to which they are connected are at the same potential. Right-answer lamps 24a, b and d cannot light because switches 57a, b and d are held open by the slide. Thus, lamp 24c shows the student the correct answer to be that positioned third on the slide without his having to close an answer switch. To select the second slide, however, the student must close answer switch 26c corresponding to the right answer to activate the card selection and sorting mechanisms. The student will already have been told or otherwise instructed that he is to move the second slide into position by closing the answer switch corresponding to the answer which has been indicated as correct; thus, switch 26c should be closed along with actuating switch 28 as was done in selecting the first slide. If this is done correctly, grounded solenoid 72c will be energized through closed switch 57c causing switch 74c to close and hold. Closure of the actuating switch 28, of course, starts the selection motor to bring the second slide into viewing position in the same manner as has already been described in connection with the selection of the first slide. At this point, however, it is necessary to remove the first slide before the second one moves into position in front of the microswitches 57.

Simultaneously with the actuation of the selection motor 47 upon the closure of switch 28, card-release solenoid 60 is energized momentarily to move door 58 within tracks 59 to drop the first slide onto belt 62 before the second slide moves into position. Solenoid 60 is grounded and connected in series with B+ potential through closed switches 74c, 28 and the conventional RC time constant circuit components comprising resistance 78 connected in series with parallel connected resistance 79 and capacitor 80. The values of resistances 78 and 79, and of capacitor 80 are chosen to provide a time constant which will permit solenoid 60 to deenergize in time to move the door back into position to support the second and each succeeding slide as it moves into viewing position. As soon as switch 74c corresponding to the correct answer closes, B+ voltage is supplied serially through contact 76c and the serially connected normally closed contacts 81a through d inclusive, of normally open triple-pole double-throw switches 82a through 82d, inclusive, to grounded relay 83 thus actuating double-pole double-throw switch 84 connected thereto and moving its arms to the normally open contacts. As switch 84 actuates and connects one normally open contact to B+ and the other to ground, the reversible sorting motor 65 operates by virtue of the series circuit from B+ through closed switches 74c and 28 to move the belt 62 to the right and dump the first slide into right-answer well 66. Upon completion of the card selection cycle, switch 55 opens momentarily and releases the holding voltages on solenoids 72c and 83 permitting switches 74c and 84 to return to their original positions as shown in full lines. Coach relay 77 also opens as soon as the holding voltage is removed therefrom when switch 55 opens momentarily.

Should the student fail to follow directions and close one of the switches 26a, b or d corresponding to a wrong answer even though lamp 24c has indicated the correct response, nothing will happen insofar as selecting a new slide until the correct switch 26c is actuated. Note, however, that as soon as one of the wrong answer switches is actuated, for example 26a, corresponding solenoid 73a will close and hold by reason of the series connection from B+ through said solenoid and the grounded normally open contact of switch 57a. Thus, switch 82a is actuated closing the series path from B+ through normally closed contact 85 of test switch 70, rectifier 86a, wrong-answer signal lamp 25a, normally open contact 87a of switch 82a and the grounded normally open contact of switch 57a, causing lamp 25a to light. At the same time, the series path through normally closed contacts 81 of switches 82 is opened at 81a preventing energization of solenoid 83 to operate switch 84. Note, however, that normally open contacts 88 of switches 82 provide a ground for the sorting motor 65 upon actuation of one of the wrong-answer solenoids. Accordingly, after wrong-answer switch 26a has been closed and wrong-answer solenoid 73a actuated to break the series connection to the sorting motor through contact 81a, closing right-answer switch 26c and actuation switch 28 will close switch 74c and connect the B+ serially through contact 76c, switch 28, the normally closed contacts of switch 84 and through contacts 88a to ground potential thereby starting the sorting motor in the reverse direction to move the first slide to the left into the wrong-answer well 67. The right-answer switch 26c must be actuated to sort the slide but the slide will move into the wrong-answer well if one of the wrong answer switches 26a, b or d has been pressed first thereby indicating that the student has failed to follow directions.

In the delayed coach mode of operation, the arm of mode switch 29 is moved from contact 71 to contact 89. In this mode B+ is connected through closed switches 55 and 57c, right answer lamp 24c, rectifier 68c, normally closed contact 69 of test switch 70 to grounded contact 90c of closed switch 74c as soon as right-answer switch 26c is closed. As in the coach mode aforementioned, B+ is also connected to ground when answer switch 26c is closed through contact 76c of closed switch 74c, serially connected normally closed contacts 81a through 81d of switches 82a through 82d, and solenoid 83 which closes switch 84 across the sorting motor and places it in condition to operate when the actuate switch 28 is closed. The selection motor 47 and relay 60 which drops the slide, also operate in the same way as in the coaching mode. In this situation, however, the right-answer lamp 24c only lights after right-answer switch 26c is actuated by the student.

If the student should select the wrong answer and close, for example, answer switch 26a, switch 82a will close upon actuation of solenoid 73a, ground and light wrong-answer lamp 25a from B+ through contact 85 of test switch 70, rectifier 86a, closed contact 87a and the grounded contact of switch 57a. As soon as wrong-answer switch 26a is closed, however, right-answer lamp 24c will also light along with wrong-answer lamp 25a. Lamp 24c has one side connected to B+ through closed switches 57c and 55, and the other side connected to ground through rectifier 68c, contact 69 of test switch 70, contact 89 of mode switch 29, and grounded contact 88a of closed switch 82a. The right-answer switch 26c must, however, be closed to connect the B+ through contact 76c of switch 74c and actuating switch 28 so that the selection motor 47, sorting motor 65 and solenoid 60, all of which are grounded, can be operated. Note, however, that once a wrong answer switch 26a has been closed, the series path through contacts 81 of the wrong-answer relays (73—82) is broken at 81a which prevents the sorting motor relay (83—84) from operating. Thus, the sorting motor will operate in the reverse direction to dump the first slide into wrong-answer well 67 by reason of the series circuit from B+ through contact 76c of closed switch 74c, closed switch 28, motor 65, switch 28 and grounded contact 88a of closed wrong relays (73a—82a). Therefore, it will be seen that in the delayed coaching mode, no lamps will light until the student selects his answer and closes the answer switch corresponding thereto. If his choice is correct, the right-answer lamp will light and the slide will be sorted in to the right-answer well upon closure of actuating switch 28. If his first choice is incorrect, the wrong-answer lamp corresponding to his choice will light along with the right-answer lamp indicating the correct choice. Thereafter, he must close the right-answer switch to supply B+ to the actuating switch which sorts the slide and selects the next one; however, the slide will be sorted into the wrong well 67 because a wrong-answer button was actuated first thus opening the series circuit to the sorting motor relay.

In the minimum coaching mode, mode switch 29 is set on dead contact 91 which removes the ground 88 of the wrong-answer relays therefrom and prevents the right-answer lamp 24c from lighting along with the wrong-answer lamp 25 when a wrong-answer switch 26a, b or d is closed. Right-answer lamp 26c is grounded through contact 90c of switch 74c as before whenever the right-answer switch 26c is closed. The wrong-answer lamp corresponding to an incorrect choice lights upon closure of the appropriate wrong-answer switch in the same manner as in the delayed coaching mode. Also, the sorting motor relay is operated to set the sorting motor to sort into the right well 66 if the first choice is the correct answer; whereas, the sorting motor relay is not energized if the first choice is an incorrect answer. Further, the right-answer switch 26c must be closed before the B+ for the selection motor, sorting motor and gate relay 60 is supplied to switch 28; however, a wrong answer provides no clue indicating the correct answer as was the case with the delayed coaching mode and the student may pick all three wrong answers before selecting the correct one.

In the test mode of operation, test switch 70 is moved from normally closed contacts 69 and 85 which correspond to the three aforementioned practice modes to normally open dead contact 92 and normally open live contact 93. With the test switch in the test position and the mode switch in any of the three possible positions thereof, the common grounds at contacts 90 of switches 74, contacts 88 of switches 82 and at switch 27 are all disconnected so that the right-answer lamps 24 cannot light. Also, the B+ supplied to the wrong answer lamps 25 through contact 85 of test switch 70 is removed to disable all the wrong-answer lamps.

As before, if the right-answer switch 26c is closed initially, the right-answer relay will operate to connect B+ through actuate switch 28 to the grounded gate solenoid 60, selection motor 47 and sorting motor 65 and, at the same time, the sorting motor relay will be energized through the closed series of contacts 81 of the wrong-answer relays to set the sorting motor to sort right into right-answer well 66 upon closure of actuating switch 28. Conversely, if one of the wrong-answer switches is closed, for example 26a, wrong-answer relays (73a—82a) will close and B+ will be supplied through normally open contact 93 of the test switch, normally open contact 94a of closed wrong relays (73a—82a) back to actuate switch 28. Closing wrong relay (73a—82a), of course, disables sorting motor relays (83—84) as before by opening normally closed contact 81a. Thus, closure of actuating switch 28 and wrong-answer switch 57a causes the sorting motor to sort left dropping the slide into wrong well 67 and it is not necessary to close the right-answer switch 57c as was the case with the practice modes already described. Here, the student has no indication of the answers nor does he know if his choices were correct or not until he checks the sorting wells.

Having thus described the several useful and novel features of the teaching and testing device of the present invention, it will be seen that the several useful objects for which it was designed have been achieved. Although the invention has been described in connection with the one specific form thereof illustrated in the accompanying drawing, I realize that certain changes and modifications may occur to those skilled in the art within the broad teaching hereof; hence, it is my intention that the scope of protection afforded hereby shall be limited only insofar as said limitations are expressly set forth in the appended claims.

What is claimed is:

1. In a tutoring and testing device, magazine means, a plurality of test slides housed within the magazine means, each test slide having presented thereon a question and at least two answers thereto, one of which is correct, and code means in said slides keyed to the correct answer, viewing means adjacent the magazine means, means operative to deliver the slides one-at-a-time from the magazine to the viewing means, response means operatively associated with the viewing means and set in accordance with the code means of the slide therein, the response means including selection means corresponding to each answer and preset in accordance with the code means, and sorting means operatively connected to the response means for actuation, said sorting means coacting with the selection means set in accordance with the correct answer upon actuation thereof to sort the slide into a pile containing slides to which correct responses were elected by the operator, and said sorting means coacting with the selection means set in accordance with the incorrect answers upon actuation thereof to sort the slide into another pile containing slides to which incorrect responses were elected by the operator.

2. The device as set forth in claim 1 in which a signal system is operatively connected to the response means, the signal system including a right-answer signal and a wrong-answer signal coupled with each selection means, actuation of the selection means set in accordance with the correct answer operating to energize the right-answer signal coupled therewith, and actuation of the selection means set in accordance with any of the incorrect answers operating to energize the wrong answer signal coupled therewith.

3. The device as set forth in claim 1 in which the means for delivering the slides to the viewing means is connected to the response means and operates to reset the selection means in accordance with the code means of each slide on delivery.

4. The device as set forth in claim 2 in which the right and wrong-answer signals of each selection means are operatively connected to the right and wrong-answer signals of the other selection means, actuation of any of the selection means set in accordance with an incorrect answer operating to energize the wrong-answer signal coupled therewith and the right-answer signal coupled with the selection means set in accordance with the correct answer to indicate the location thereof.

5. The device as set forth in claim 2 including coach means operatively interconnecting the response means and the signal system by-passing the selection means, the coaching means being operative upon actuation thereof to energize the right-answer signal coupled with the selection means set in accordance with the correct answer.

6. The device as set forth in claim 2 in which the means delivering the slides to the response means operates to reset the selection means and signal system in accordance with the code means on each test slide on delivery.

7. In a tutoring and testing device, test means having presented thereon a question and at least two answers thereto, one of which is correct, and code means in said test means keyed to indicate said correct answer, manually-actuated response means adapted to operatively cooperate with the code means, said response means including separate selection means corresponding to each answer for making an election therebetween, sorting means operatively connected to the response means for actuation, said sorting means and the selection means corresponding to the correct answer coacting upon actuation thereof to move a test means in one direction for deposit, and said sorting means and the selection means corresponding to each incorrect answer coacting upon actuation thereof to move a test means in another direction for deposit thus effecting a classification of the test means in accordance with the response of the operator and signal means operatively connected to each selection means and operatively interconnected with one another, one of said signal means indicating an elected answer as being correct upon actuation of the selection means corresponding to said correct answer, another of said signal means indicating an elected answer as being incorrect upon actuation of the selection means corresponding to said incorrect answer, and said signal means connected to the selection means corresponding to the correct answer being operative to indicate the location thereof upon actuation of said selection means corresponding to an incorrect answer.

8. The device as set forth in claim 7 in which each signal means connected to a selection means includes a right-answer signal and a wrong answer signal, the right answer signal corresponding to the selection means connected to the correct answer being energized upon actuation of any of the selection means and the wrong-answer signal being energized upon actuation of the selection means corresponding to an incorrect answer.

9. In a tutoring and testing device, test means having presented thereon a question and at least two answers thereto, one of which is correct, and code means in said test means keyed to indicate said correct answer, manually-actuated response means adapted to operatively cooperative with the code means, said response means including separate selection means corresponding to each answer for making an election therebetween, sorting means operatively connected to the response means for actuation, said sorting means and the selection means corresponding to the correct answer coacting upon actuation thereof to move a test means in one direction for deposit, and said sorting means and the selection means corresponding to each incorrect answer coacting upon actuation thereof to move a test means in another direction for deposit thus effecting a classification of the test means in accordance with the response of the operator, selection means including signal means operative upon actuation of said selection means to selectively indicate the elected answer as correct or incorrect and coaching means interconnecting the response means and the signal means by-passing the selection means, said coaching means being operative upon actuation thereof to energize the signal means corresponding to the correct answer even in the absence of the selection means corresponding to the correct answer being actuated.

10. In a tutoring and testing device, a plurality of test slides each having presented thereon a question and at least two answers thereto, one of which is correct, and code means in said test slides keyed to indicate said correct answer, manually-actuated response means adapted for operative cooperation with the code means of each test slide delivered thereto, said response means including separate selection means corresponding to each answer for making an election therebetween, means operative to deliver the test slides one-at-a-time to the response means, and sorting means operatively connected to response means for actuation, said sorting means and the selection means corresponding to the correct answer coacting upon actuation thereof to move the test slides in one direction for deposit, and said sorting means and selection means and selection means corresponding to each incorrect answer coacting upon actuation thereof to move the test means in another direction for deposit thus classifying the test slides in accordance with the response of the operator wherein said means delivering the slides to the response means operates to reset the selection means in accordance with the code means of each slide on the delivery of a slide.

11. In a tutoring and testing device, a plurality of test slides each having presented thereon a question and at least two answers thereto, one of which is correct, and code means in said test slides keyed to indicate said correct answer, manually-actuated response means adapted for operative cooperation with the code means of each test slide delivered thereto, said response means including separate selection means corresponding to each answer for making an election therebetween, means operative to deliver the test slides one-at-a-time to the response means, sorting means operatively connected to response means for actuation, said sorting means and the selection means corresponding to the correct answer coacting upon actuation thereof to move the test slides in one direction for deposit, and said sorting means and selection means corresponding to each incorrect answer coacting upon actuation thereof to move the test means in another direction for deposit thus classifying the test slides in accordance with the response of the operator, and a right-wrong answer signal system operatively interconnecting the response means with the code means of each slide, said system operating to indicate the elected answer as being correct or incorrect upon actuation of one of the selection means by the operator wherein said means delivering the slide to the response means operates to reset the selection means and signal system in accordance with the code means on each test slide on delivery of a silde.

References Cited in the file of this patent

UNITED STATES PATENTS

| | | |
|---|---|---|
| 2,148,259 | Cisin | Feb. 21, 1939 |
| 2,340,251 | Nesbit | Jan. 25, 1944 |
| 2,564,089 | Williams et al. | Aug. 14, 1951 |